United States Patent [19]

Naganoma et al.

[11] 4,358,050
[45] Nov. 9, 1982

[54] AIR CONDITIONER CONTROL METHOD AND APPARATUS

[75] Inventors: Masanori Naganoma, Kariya; Nobuo Kondo, Anjo; Eiichi Senda, Ohbu; Hitoshi Hibi, Kariya; Kunihiko Suzuki, Kariya; Nobuyoshi Ohta, Kariya; Katsunori Ito, Aichi, all of Japan

[73] Assignee: Nippondenso Co., Ltd., Kariya, Japan

[21] Appl. No.: 160,452

[22] Filed: Jun. 18, 1980

[30] Foreign Application Priority Data

Jun. 22, 1979 [JP] Japan .................................. 54-79544

[51] Int. Cl.³ ............................................ G05D 23/00
[52] U.S. Cl. ....................................... 236/13; 236/49; 165/42
[58] Field of Search ...................... 236/13, 49; 165/23, 165/41-43

[56] References Cited

U.S. PATENT DOCUMENTS

| | | | |
|---|---|---|---|
| 3,263,739 | 8/1966 | Gaskill et al. | 165/23 |
| 3,315,730 | 4/1967 | Weaver et al. | 165/23 |
| 3,662,818 | 5/1972 | Snyder | 165/23 |
| 4,289,272 | 9/1981 | Murase et al. | 236/91 D |

Primary Examiner—Albert J. Makay
Assistant Examiner—Harry Tanner
Attorney, Agent, or Firm—Cushman, Darby & Cushman

[57] ABSTRACT

A vehicle air conditioner control method and apparatus for automatically controlling the air conditioning of the compartment of a vehicle in accordance with a predetermined automatic control pattern, uses a selector for selecting a desired air conditioning condition. In response to the command signal from the selector, changeover from the control parameters, such as, air flow rate and supply air temperature for an automatic control mode to the selected control parameters for a selected air conditioning mode is effected, thus making it possible to selectively control the air conditioning of the vehicle compartment in accordance with a predetermined automatic control mode and a selected air conditioning mode.

11 Claims, 12 Drawing Figures

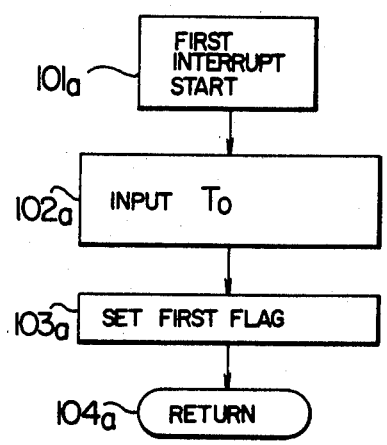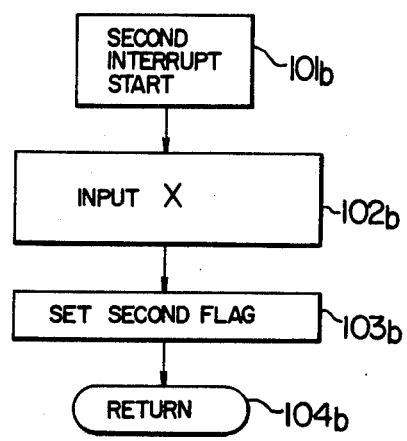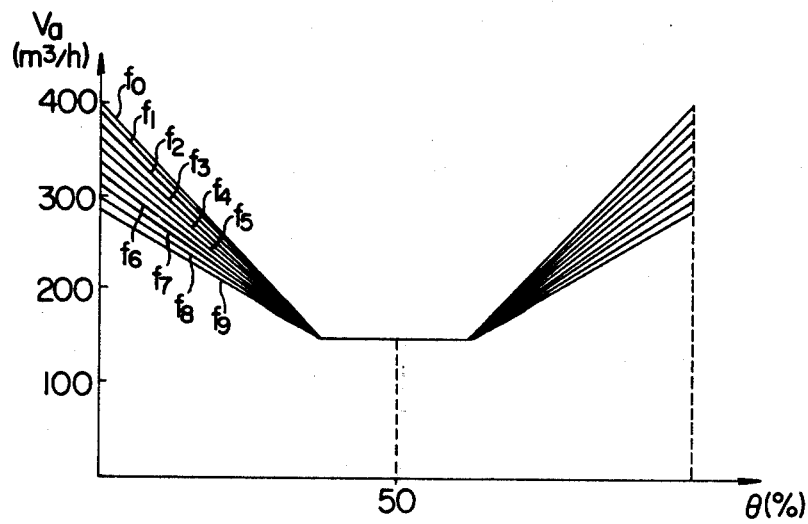

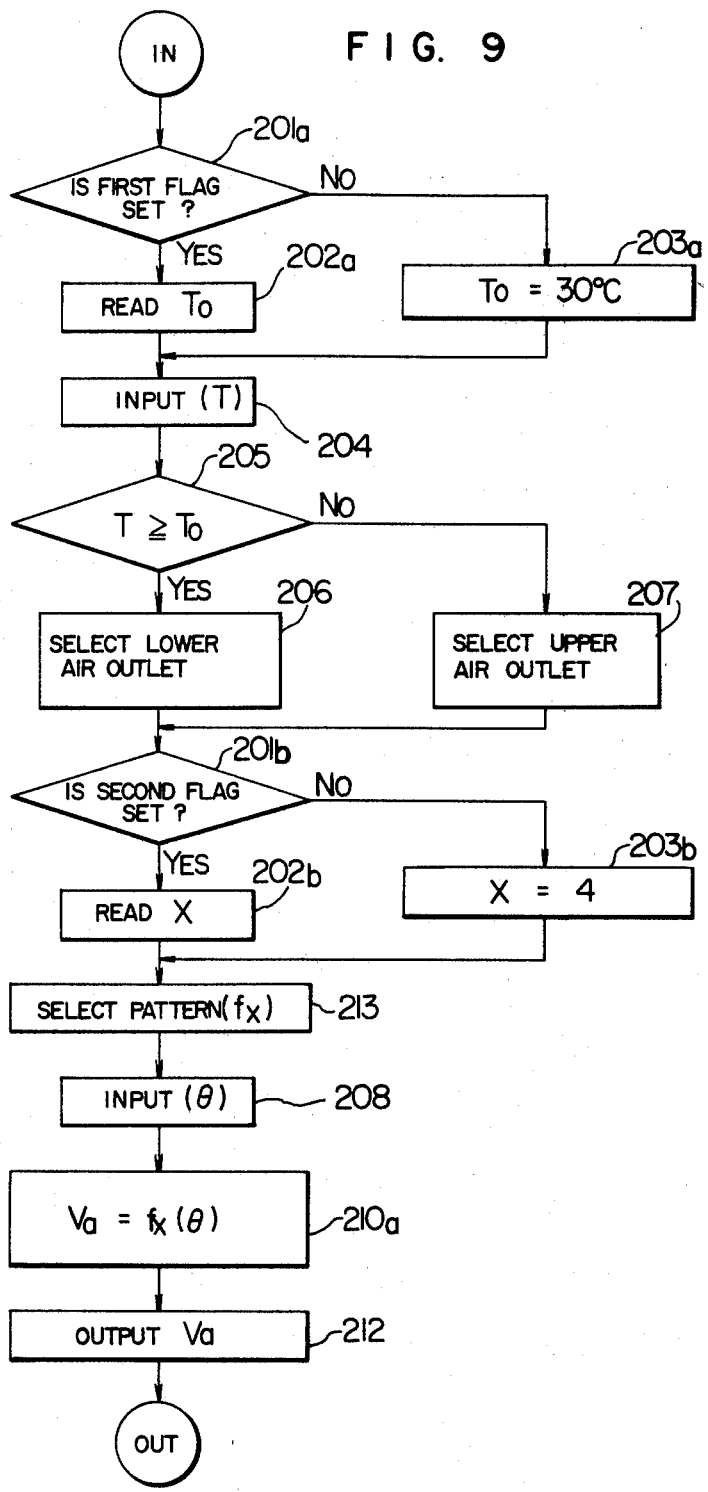

AIR CONDITIONER CONTROL METHOD AND APPARATUS

The present invention relates to a method and apparatus for automatically controlling the air conditioning of a compartment of an automotive vehicle.

Known temperature control means of a vehicle air conditioner system may include, for example, an inside-outside air changeover damper, an air mixing damper, a blower motor and a compressor. Systems are known in which these components are automatically regulated in accordance with a predetermined control pattern so as to automatically control the air conditioning of a compartment of an automotive vehicle.

However, this type of known control method is disadvantageous in that since the automatic control is accomplished in accordance with a predetermined control pattern, the temperature of the vehicle compartment is simply maintained at a predetermined value without giving any consideration to the physical conditions and feeling of the occupants of the vehicle and thus the resulting air conditioning control can hardly be said to be optimum.

With a view to overcoming the foregoing deficiencies in the prior art, it is the object of the present invention to provide an improved vehicle air conditioner control method in which the automatic control pattern is changed as desired in accordance with the supply air temperature, thereby ensuring a suitable automatic air conditioning control in accordance with an automatic control pattern that suits the vehicle occupants.

It is another object of the invention to provide an apparatus capable of suitably performing such vehicle air conditioner control method.

A more detailed and complete understanding of the present invention may be obtained from the following detailed description taken in conjunction with the accompanying drawings, in which:

FIGS. 7 and 8 are flowcharts showing the interrupt operations performed in response to the numerical input unit shown in FIG. 6;

FIG. 9 is a computing flowchart of a second embodiment of the invention showing an automatic control computing routine including the interrupt operations of FIGS. 7 and 8;

FIG. 10 is a graph showing the relationship between the air mixing damper position and the air flow rate;

Figure 1:
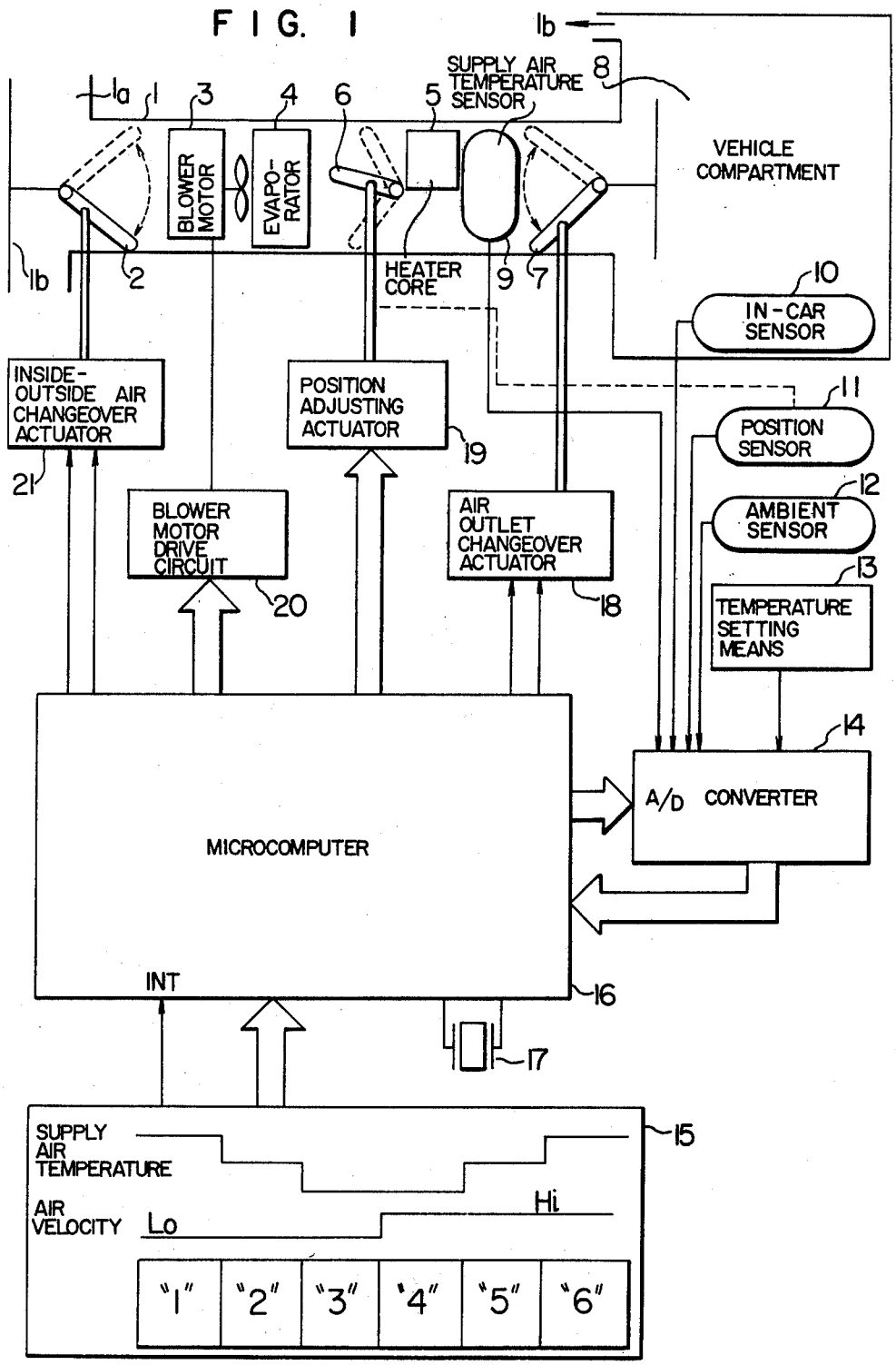
FIG. 1 is a block diagram showing the overall construction of an embodiment of this invention.

Referring now to FIG. 1, there is illustrated the overall construction of an embodiment of the present invention which employs a vehicle-mounted microcomputer for performing digital computational operations defined by software in accordance with a predetermined control program.

In the Figure, numeral 1 designates the air duct of an air conditioner system installed in an automotive vehicle including an outside air inlet 1a for introducing the air outside the vehicle and an inside air inlet 1b for introducing and circulating the compartment interior air. Numeral 2 designates an inside-outside air changeover damper for selectively opening the outside and inside air inlets 1a and 1b to selectively effect the introduction of outside air and the circulation of inside air. Numeral 3 designates a blower motor for driving a sirocco fan which is so designed that the air drawn through the outside air inlet 1a or the inside air inlet 1b is supplied into the duct, the rotational speed of the fan being controlled to vary the rate of air flow. Numeral 4 designates an evaporator disposed crosswise inside the duct 1 so that the air blown by the blower motor 3 is cooled as it passes therethrough. Numeral 5 designates a heater core disposed inside the duct 1 for receiving the engine cooling water so that its heat is utilized to heat the air passing therethrough. Numeral 6 designates an air mixing damper disposed upstream of the heater core 5 so that the ratio of air flowing into the heater core 5 to the air passing through the evaporator 4 is adjusted to mix the cooled air or cold air with the heated air or hot air and thereby to adjust the compartment temperature. The position or opening of the air mixing damper 6 is automatically controlled in accordance with the inside and outside air temperature data and the damper position data fed back so as to maintain the compartment temperature at a controlled point or preset temperature. Numeral 7 designates an air outlet changeover damper for selectively opening air outlets so as to supply the air passed through the air mixing damper 6 into the upper or lower part of a vehicle compartment 8. Numeral 9 designates a supply air temperature sensor for sensing the temperature of the air flowing through the air mixing damper 6 to generate a supply air temperature signal. Numeral 10 designates an in-car sensor for sensing the temperature of the compartment 8 to generate a compartment temperature signal. Numeral 11 designates a position sensor for sensing the position of the air mixing damper 6 to generate a position signal. Sensor 11 comprises a potentiometer operatively connected to the air mixing damper 6. The position sensor 11 and the supply air temperature sensor 9 form sensing means. Numeral 12 designates an ambient sensor for sensing the temperature of the outside air to generate an outside air temperature signal, and 13 temperature setting means for determining a control point or preset temperature, which is manually operated by the occupant to set a desired compartment temperature. Numeral 14 designates an A/D converter for converting analog signals to digital signals, which sequentially converts the supply air temperature signal from the supply air temperature sensor 9, the compartment temperature signal from the in-car sensor 10, the position signal from the position sensor 11, the outside air temperature signal from the ambient sensor 12 and the setting signal from the temperature setting means 13 to digital signals. Numeral 15 designates a pattern selector comprising six pushbutton switches "1", "2", "3", "4", "5" and "6" which are connected to each other so that simultaneous closing of two or more of them is prevented and the closing of each of the switches results in the generation of a command signal and the opening of a gate corresponding to the switch thus supplying as a pattern signal the stored content of a register storing the pattern data corresponding to the switch. The supply air temperatures written on the pattern selector 15 indicate the changeover air temperatures at which the air outlet changeover damper 17 is operated and the air velocities indicate the air velocity pattern of the air from the blower motor 3 corresponding to the air mixing damper 6. The register contents stored in the pattern selector 15 are such that if $T_o$ represents the changeover air temperature and X represents the air velocity pattern, then $T_o=35°$ C. and $X=L_o$ are selected for the switch "1", $T_o=30°$ C. and $X=L_o$ for the switch "2", $T_o=25°$ C. and $X=L_o$ for the switch "3", $T_o=25°$ C. and $X=Hi$ for the switch "4", $T_o=30°$ C. and $X=Hi$ for the switch "5" and $T_0=35°$ C. and $X=Hi$ for the switch "6".

Numeral 16 designates a single-chip microcomputer for performing digital computational operations defined by software in accordance with a predetermined control program and it forms computing means. A crystal element 17 of several MHz is connected to the microcomputer 16 and a stabilizing power supply circuit (not shown) is supplied with a supply power from a vehicle battery to generate and supply a stabilized voltage of 5 volts to the microcomputer 16 thus bringing it into operation. The microcomputer 16 is comprised of a single-chip large-scale integrated circuitry (LSI) formed as its principal components with a read-only memory (ROM) storing a control program including an automatic control program and defining computing procedures, a central processing unit (CPU) for sequentially reading the control program from the ROM to perform the associated computational operations, a random access memory (RAM) into which the various data related to the operations of the CPU are temporarily stored and from which the data are read by the CPU, a clock generator with the crystal element 17 for generating the required reference clock pulses for computational operations, and an input/output or I/O circuit section for controlling the input and output of signals. The microcomputer 16 operates in such a manner that the detection signals from the supply air temperature sensor 9, the in-car sensor 10, the position sensor 11 and the ambient sensor 12 and the setting signal from the temperature setting means 13 are sequentially converted by the A/D converter 14 to digital signals and the digital signals are applied to the microcomputer 16 which in turn performs the required operations and decisions and generates the required command signals for controlling the changing operations of the inside-outside air changeover damper 2 and the air outlet changeover damper 7, the rotational speed of the blower motor 3 and the position of the air mixing damper 6.

Numeral 18 designates an air outlet changeover actuator designed so that an upper or lower part command signal applied from the microcomputer 16 is latched and the air outlet changeover damper 7 is moved by means of the negative pressure to direct the air flow into the upper or lower part of the compartment. Numeral 19 designates a position adjusting actuator designed so that the position controlling command signal applied from the microcomputer 16 is latched and the position of the air mixing damper 6 is adjusted in accordance with the command signal, and the position adjusting actuator 19 comprises two electromagnetic valves (or double vacuum valves) which are turned on and off so that the command signal is converted to a value of negative pressure necessary for temperature control purposes and the negative pressure is applied to the diaphragm thus operating the air mixing damper 6. Numeral 20 designates a blower motor drive circuit designed so that the rotation command signal applied from the microcomputer 16 is latched and the rotational speed of the blower motor 3 is continuously controlled in accordance with the rotation command signal. Numeral 21 designates an inside-outside air changeover actuator designed so that the inside/outside air command signal applied from the microcomputer 16 is latched and the inside/outside air changeover damper 2 is moved by means of negative pressure to supply the inside or outside air. The air outlet changeover actuator 18 and the inside-outside air changeover actuator 21 form drive means.

With the construction described above, the operation of the embodiment will now be described with reference to the pattern diagram shown in FIG. 2 and the flowcharts shown in FIGS. 3 and 4.

Figure 2:
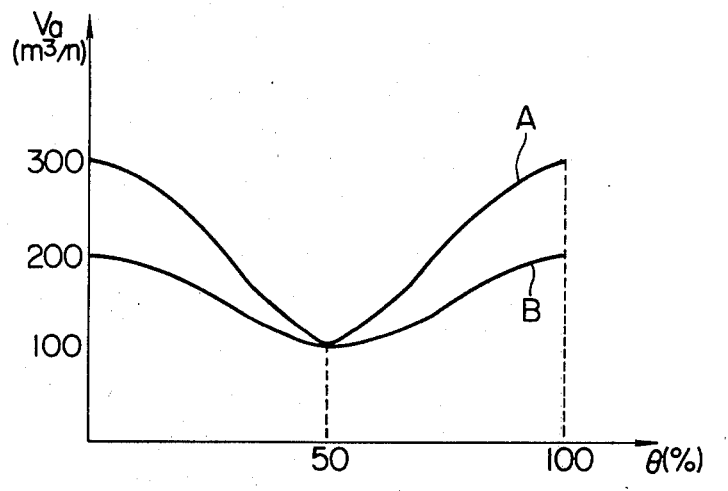
FIG. 2 is a pattern diagram showing the relationship between the air mixing damper position and the air flow rate.

The pattern diagram of FIG. 2 shows the relationship between the position $\theta$ of the air mixing damper 6 and the air flow rate $V_a$ determined by the rotational speed of the blower motor 3, and the Figure shows a mutual automatic control pattern for the air mixing damper 6 and the blower motor 3. The flowchart of FIG. 3 shows the detailed computing steps of an interrupt routine performed in accordance with the command signal from the pattern selector 15, and the flowchart of FIG. 4 shows the detailed computing steps of an automatic control routine or automatic control program. The operation of the microcomputer 16 will be described first. When, in the vehicle equipped with the control apparatus of this invention, the air conditioner or A/C switch is closed, the microcomputer 16 is brought into operation by the stabilized voltage supplied from the stabilizing power supply circuit so that the initialization steps such as the resetting of its registers, counters, latches and flags are performed and then the computing steps of the main routine according to the control program comprising the various control programs and the automatic control program are executed at a period of about several hundreds msec.

Figure 3:
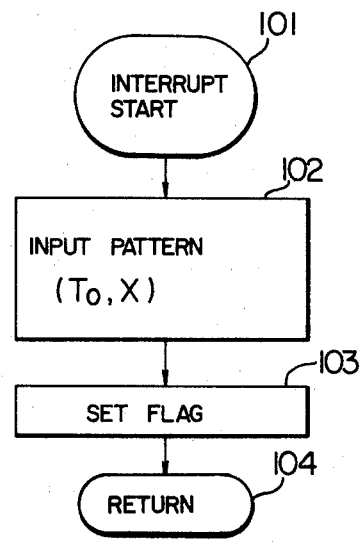
FIG. 3 is an interrupt flowchart showing the interrupt operation performed in accordance with the control program of the microcomputer of FIG. 1.
Figure 4:
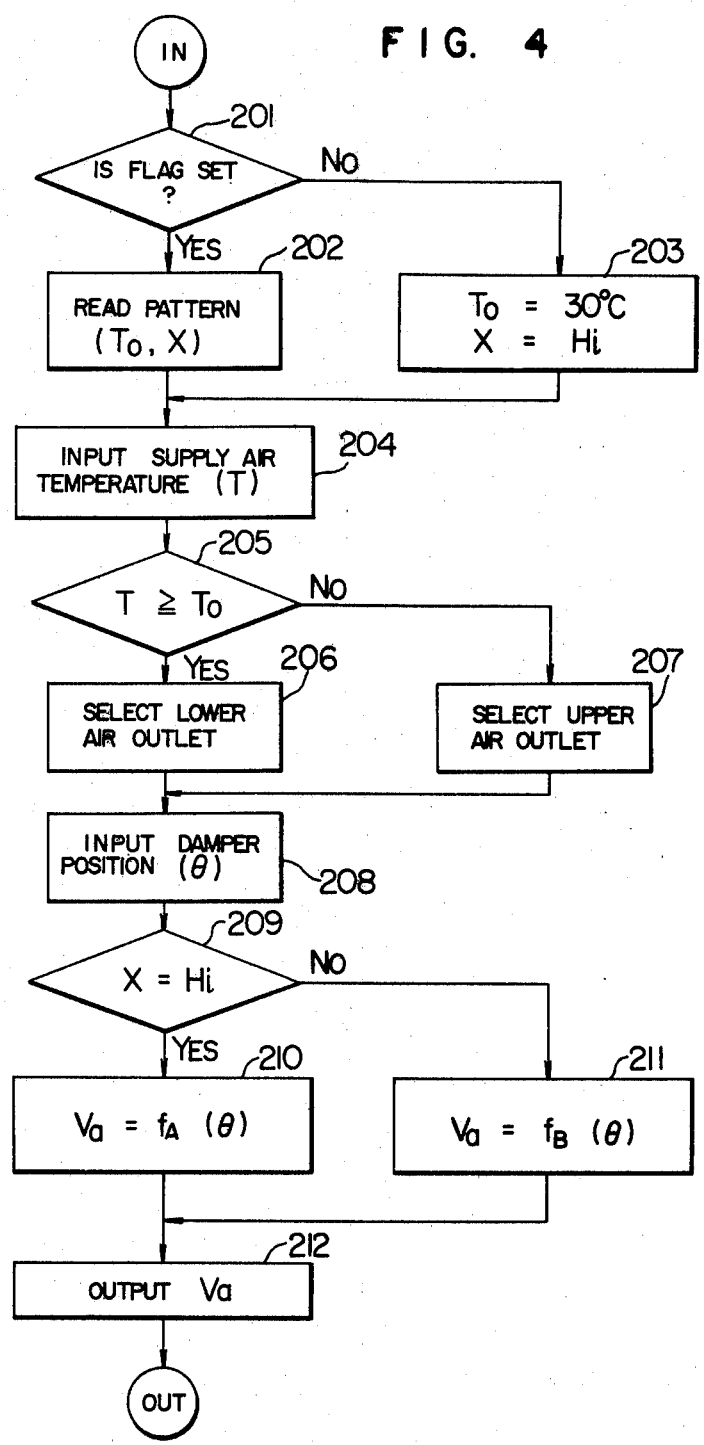
FIG. 4 is a flowchart showing the computation processing of the automatic control computing routine according to the control program.

During the execution of the main routine, if a command signal is applied from the pattern selector 15 to the interrupt or INT terminal of the microcomputer 16, the operation of the main routine is stopped temporarily and control is transferred to an interrupt start step 101 of the interrupt routine shown in FIG. 3. The control is then transferred to a pattern input step 102 so that pattern signals including the required data of changeover air temperature $T_o$ and air velocity pattern X are received from the pattern selector 15 and stored in the specified storage locations of the RAM. The control is then transferred to a flag setting step 103 which in turn sets a flag. Then the control is transferred to a return step 104 so that the interrupt operation of the interrupt routine is completed and the computation of the main routine which was previously stopped temporarily is resumed.

In accordance with the compartment temperature signal from the in-car sensor 10, the position signal from the position sensor 11, the outside air temperature signal from the ambient sensor 12 and the setting signal from the temperature setting means 13, the respective control computing routines of the main routine perform the computational operations required for operating the inside-outside air changeover damper 2, adjusting the position of the air mixing damper 6, turning on and off the compressor (not shown) and so on so as to provide a comfortable compartment condition while maintaining the compartment temperature at the control point or the preset temperature.

The computing steps in the automatic control operation routine of the main routine will now be described with reference to the flowchart of FIG. 4. When the automatic control operation routine is initiated, the control is transferred to a flag determination step 201 to determine whether the flag has been set. If it is not, the determination gives an indication of "NO". If the flag has been set, the determination gives an indication of "YES" and the control is transferred to a pattern read step 202. The pattern read step 202 reads the changeover air temperature $T_o$ and the air velocity pattern X which were received and stored in the memory by the pattern input step 102 of the interrupt routine shown in FIG. 3, and the control is passed to a supply air temperature step 204. On the contrary, if the result of the determination by the flag determination step 201 is "NO", the control is passed to a pattern setting step 203 so that the changeover air temperature $T_o$ is set to 30° C. and the air velocity pattern X is set to Hi. Then the control is passed to the supply air temperature step 204. The step 204 converts the analog temperature signal supplied from the supply air temperature sensor 9 by the A/D converter 14 to generate a digital data of supply air temperature T, and then the control is passed to the next supply air temperature determination step 205. The step 205 determines whether the air temperature T is higher than the changeover air temperature $T_o$ so that if the air temperature T is lower than the air temperature $T_o$, the result of the determination becomes "NO". If the air temperature T is higher than the air temperature $T_o$, the determination gives an indication of "YES" and the control is passed to a lower part command step 206. The lower part command step 206 applies a lower part command signal to the air outlet changeover actuator 18 so as to select the lower air oultet or move the air outlet changeover damper 7 to the position indicated by the dotted line in FIG. 1, and the control is passed to a damper position step 208. If the determination of the air temperature determination step 205 is "NO", the control is passed to an upper part command step 207 which in turn applies an upper part blowing command to the air outlet changeover actuator 18 so as to select the upper air outlet or move the air outlet changeover damper 7 to the position indicated by the solid line in FIG. 1, and then the control is passed to the damper position step 208. The damper position step 208 converts the analog position signal from the position sensor 11 by the A/D converter 14 to generate a digital data of position $\theta$, and the control is passed to an air velocity pattern determination step 209. The step 209 determines whether the air velocity pattern X is Hi so that if it is not or the pattern is $L_o$, the determination gives an indication of "NO". If the air velocity pattern X is Hi, the result of the determination becomes "YES" and the control is passed to a pattern-A step 210. The step 210 determines the air flow rate $V_a$ from the position $\theta$ of the air mixing damper 6 in accordance with the pattern A in the pattern diagram of FIG. 2, and the control is passed to an output step 212. On the other hand, if the result of the air velocity pattern determination step 209 is "NO", the control is passed to a pattern-B step 211 so that the air flow rate $V_a$ is obtained from the position $\theta$ of the air mixing damper 6 in accordance with the pattern B in the pattern diagram of FIG. 2, and the control is passed to the output step 212. The output step 212 applies to the blower motor drive circuit 20 a speed command signal corresponding to the air flow rate $V_a$, and one cycle of the computation by the automatic control computing routine is completed.

The overall operation of the automatic control under different conditions will now be described in due order.

Initially, when the A/C switch is closed so that the microcomputer 16 is brought into operation by the stabilized voltage supplied from the stabilizing power supply circuit which is not shown, the initialization steps, such as, the resetting of the registers, counters, latches and flags are performed and the main routine comprising the selected-objects control computing routines and the automatic control computing routine is performed repeatedly.

In this case, if none of the selector switches in the pattern selector 15 has been closed and the temperature of the air at the air outlet is 28° C., since the flag has been reset by the initialization, when the control is passed to the flag determination step 201 of the automatic control operation routine, the result of the determination becomes "NO" and consequently the control is passed to the pattern setting step 203 which in turn sets the changeover air temperature $T_o$ to 30° C. and the air velocity pattern X to Hi. Then, the control is passed to the supply air temperature step 204 so that the analog temperature signal of the sensor 9 is converted into the digital temperature data T by the A/D the converter 14, and then the control is passed to the blown air temperature determination step 205. In this case, since the temperature of the air at the air outlet or the supply air temperature T is 28° C. and the changeover air temperature $T_o$ is 30° C., the resulting determination becomes "NO" so that the control is passed to the upper part command step 207 and an upper part blowing command is applied to the air outlet changeover actuator 18 to select the upper air outlet or move the damper 7 to the position indicated by the solid line in FIG. 1. Then the control is passed to the damper position step 208 so that the analog position signal of the sensor 11 is converted into the digital data $\theta$ by the A/D converter 14, and then the control is passed to the air velocity pattern determination step 209. In this case, since the air velocity pattern X has been set to Hi by the pattern setting step 203, the resulting determination becomes "YES" and the control is passed to the pattern-A step 210. As a result, the air flow rate $V_a$ is determined in accordance with the pattern A shown in FIG. 2 and the control is passed to the output step 212 which in turn applies to the blower motor drive circuit 20 a speed command corresponding to the air flow rate $V_a$. This completes one cycle of the computation by the automatic control computing routine.

Thereafter, the same computation is repeated at a period of several hundred msec so that in accordance with the operations performed by the respective control operation routines the operation of the inside-outside air changeover damper 2 is controlled and the position of the air mixing damper 6 is also controlled in such a manner that the temperature of the compartment 8 is maintained at the value preset by the temperature setting means 13. If necessary, the turning on and off of the compressor (not shown) are also controlled. Also, in accordance with the computation performed by the automatic control operation routine the air outlet changeover damper 7 is moved into the position indicated by the solid line in FIG. 1 and the speed of the blower motor 3 is controlled to provide the air flow rate $V_a$ determined by the position $\theta$ of the air mixing damper 6 in accordance with the pattern A in FIG. 2.

In the course of this repeated computation with the supply air temperature being maintained at 28° C., if the vehicle occupant depresses the switch "3" of the pattern selector 15, the resulting command signal is supplied to the terminal INT of the microcomputer 16 and also the contents of the register stored in correspondence with the switch "3", i.e., $T_o = 25°$ C. and $X = L_o$ are supplied to the microcomputer 16 through the gate. As a result, the microcomputer 16 temporarily stops the repeated computation of the main routine so that the control is transferred to the interrupt start step 101 of the interrupt routine shown in FIG. 3 and the control is further transferred to the pattern input step 102 which in turn receives and stores in the specified storage locations of the RAM the pattern signals including the data of $T_o = 25°$ C. and $X = L_o$. Then the control is transferred to the flag setting step 103 so that the flag is set and the control is transferred to the return step 104 which in turn returns the control to the main routine to resume the computation at the place where it was previously interrupted.

When this occurs, since the flag has been set when the control is passed to the flag determination step 201 of the automatic control operation routine, the determination of this step changes from "NO" to "YES" and consequently the control is passed to the pattern read step 202. The pattern read step 202 reads the data of $T_o = 25°$ C. and $X = L_o$, and the supply air temperature step 204 converts the analog output signal of the sensor 9 into the corresponding digital data T. Then, the control is passed to the supply air temperature determination step 205. When this occurs, since the blown air temperature is 28° C. and the changeover air temperature $T_o$ is 25° C., the determination of the step 205 changes from "NO" to "YES" and a low part blowing command is applied to the air outlet changeover actuator 18 so as to move the air outlet changeover damper 7 into the position indicated by the dotted line in FIG. 1, and then the control is passed to the damper position step 208. The step 208 converts the analog output signal of the sensor 11 into the corresponding digital data $\theta$ of the air mixing damper 6 and the control is passed to the air velocity pattern determination step 209. Since the air velocity pattern X has been set to $L_o$, the determination of the step 209 changes from "NO" to "YES" and the control is passed to the pattern-B step 211 which in turn determines the air flow rate $V_a$ in accordance with the pattern B shown in FIG. 2. The control is further passed to the output step 212 so that a speed command corresponding to the air flow rate $V_a$ is applied to the blower motor drive circuit 20. This completes one cycle of the computation by the automatic control operation routine and the control is returned to the individual control operation routines. Thereafter, the same computation is repeated at a period of several hundreds msec so that the controls are performed to maintain the compartment temperature at a preset value, the lower air outlet is selected and the air flow provided by the operation of the blower motor 3 is reduced, thereby ensuring a comfortable temperature control which meets the direction of the occupant.

If any one of the switches "1", "2", "4", "5" and "6" other than the switch "3" is depressed, the necessary computation will be performed in accordance with the changeover air temperature $T_o$ and the air velocity pattern X corresponding to the depressed switch, thus ensuring a suitable temperature control corresponding to the switch.

While the supply air temperature of 28° C. has been used in the above description, it should be apparent that if any other temperature is used, the air outlet changeover damper 7 can be suitably operated in accordance with the relation between the supply air temperature T and the changeover air temperature $T_o$.

More specifically, the above-described embodiment has a feature that any air conditioning control that suits the occupants can be provided by simply depressing selected one of the switches in the pattern selector 15, thus permitting to input any desired control pattern easily without requiring any complicated operations.

While, in the embodiment described above, the rotational speed of the blower motor 3 and the operation of the air outlet changeover damper 7 are controlled in accordance with the pattern signals corresponding to any one of the switches "1" to "6" in the pattern selector 15, in the case of an apparatus in which the inside-outside air changeover damper, air outlet changeover damper, air mixing damper, blower motor and compressor forming air conditioner temperature control means are controlled automatically in dependence on one another, the correlation constants may be selected so that assuming that the supply air temperature rises over 30° C. when the position $\theta$ of the air mixing damper 6 exceeds 60% of its final value, this constant of 60% at which the air outlet changeover damper 7 is operated to automatically select the lower air outlet may be freely set and inputted by means of an external constant selector. The external constant selector may be designed so that any one of a plurality of constants may be selected or the occupant may select any desired number to determine a constant. The external constant selector needs not be of the pushbutton type and it may be replaced with a card reader of the type adapted to read selected one of a plurality of preliminarily recorded cards. Further, while the supply air temperature sensor 9 is used to determine the supply air temperature T, the temperature T may be obtained in a pseudo manner in accordance with the position of the air mixing damper 6.

Figure 5:
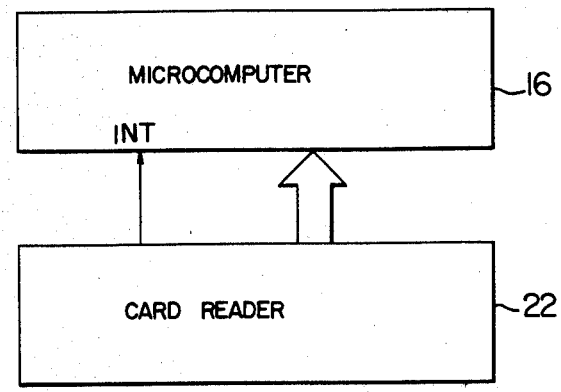
FIG. 5 is a schematic diagram showing the use of a card reader in place of the pattern selector in the embodiment of FIG. 1.

A second embodiment of the present invention or a partially modified form of the first embodiment of FIG. 1 modified according to the above-mentioned propositions will now be described with reference to FIGS. 5 to 12. FIG. 5 shows a card reader 22 which is used in place of the pattern selector 15 of FIG. 1. The card reader 22 includes a large number of cards each having a predetermined changeover air temperature $T_o$ and air velocity pattern X punched therein, whereby when the vehicle occupant selects and inserts desired one of the cards into the card reader 22, an interrupt request signal and the corresponding data of $T_o$ and X are applied to the microcomputer 16.

Figure 6:
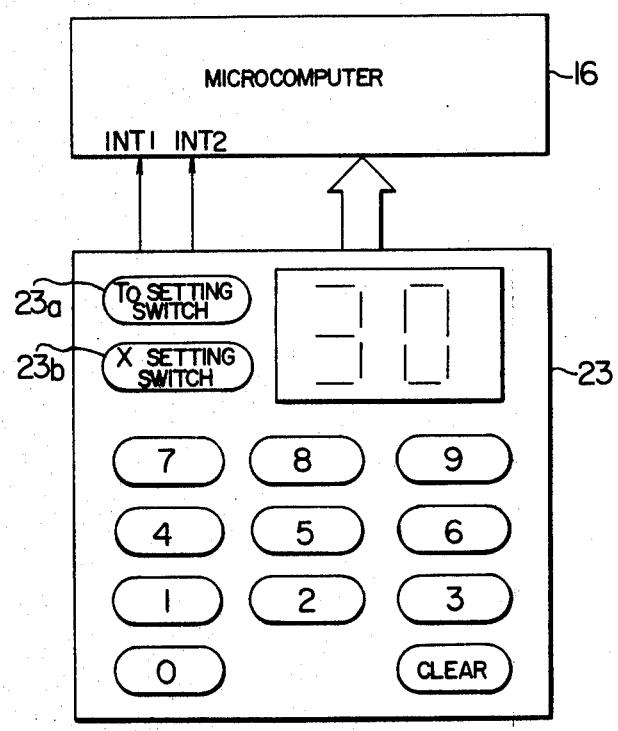
FIG. 6 is a schematic diagram showing the use of a pattern selector consisting of a numerical input unit.

FIG. 6 shows a numerical input unit 23 used in place of the pattern selector 15 of FIG. 1, in which any desired changeover air temperature is preset in the form of a two-figure number so that when a $T_o$ setting switch 23a is closed, a first interrupt request signal and a signal corresponding to the preset two-figure number are applied to the microcomputer 16. Also any desired air velocity pattern X is preset in the form of a single-figure number so that when an X setting switch 23b is closed, a second interrupt request signal and a signal corresponding to the preset single-figure number are applied to the microcomputer 16. FIGS. 7 and 8 are flowcharts showing the interrupt operations which will be performed in accordance with the first and second interrupt request signals from the numerical input unit 23. The first interrupt operation shown in FIG. 7 comprises inputting the two-figure numeric data of changeover air temperature $T_o$ applied from the numerical input unit 23 (step 102a) and setting a first flag (step 103a), and the second interrupt operation shown in FIG. 8 comprises inputting the single-figure numeric data of air velocity pattern X applied from the numerical input unit 23 (step 102b) and setting a second flag (step 103b).

FIG. 9 is a flowchart showing the processing steps of the automatic control computing routine forming part of the main routine and associated with the interrupt operations shown in FIGS. 7 and 8. The computation shown in FIG. 9 corresponds to the computation shown in FIG. 4 and the same numbered steps perform the same operations as in the case of FIG. 4. A first flag determination step 201a determines whether the first flag has been set so that if it is or "YES", the control is passed to a $T_o$ read step 202a which in turn inputs the two-figure numeric data indicative of the changeover air temperature $T_o$ inputted by the $T_o$ input step 102a shown in FIG. 7. If the determination of the step 201a is "NO", the control is passed to a $T_o$ setting step 203a and the changeover air temperature $T_o$ is set to 30° C. A second flag determination step 201b determines whether the second flag has been set so that if it is or "YES", the control is passed to an X input step 202b which in turn inputs the single-figure numeric data indicative of the air velocity pattern X inputted by the X input step 102b shown in FIG. 8. If the determination of the step 201b is "NO", the control is passed to an X setting step 203b and the air velocity pattern X is set to 4. After the X read step 202b or the X setting step 203b, the control is passed to a pattern selection step 213 and one of the air velocity patterns $f_o$ to $f_9$ shown in FIG. 10 is selected. As described before, the damper position step 208 converts the analog position signal of the position sensor 11 by the A/D converter 14 into the corresponding digital data $\theta$. An air flow computing step 210a computes the air flow rate $V_a$ from an equation $V_a = f_x(\theta)$ or the characteristic curve shown in FIG. 10 using the converted digital data $\theta$ as a parameter to the selected air velocity pattern $f_x$.

Figure 11:
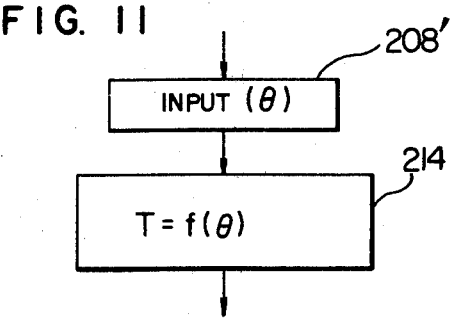
FIG. 11 is a flowchart of an operation for obtaining a supply air temperature T in accordance with a predetermined functional relation of the air mixing damper position with the temperature T.
Figure 12:
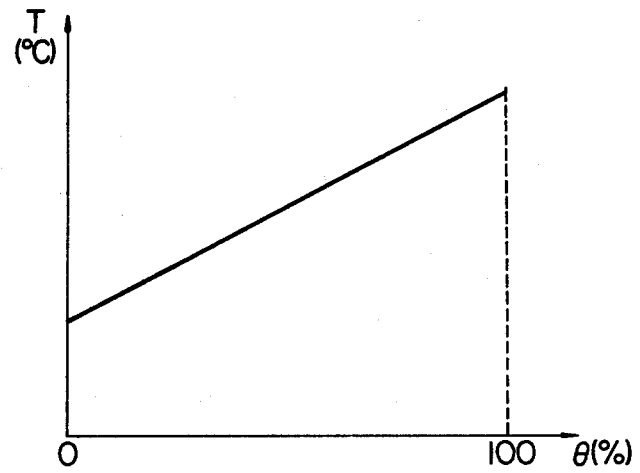
FIG. 12 is a graph showing an example of the functional relation of FIG. 11.

FIG. 11 shows the operation whereby the blown air temperature T is determined in a pseudo manner using the converted digital data $\theta$ as a parameter. In FIG. 4 or 9, the damper position step 208 is eliminated and the damper position step 208' and a conversion step 214 shown in FIG. 11 are inserted in place of the eliminated supply air temperature step 204. Using the converted digital data $\theta$ as a parameter, the conversion step 214 determines such corresponding digital data T in a pseudo manner in accordance for example with a characteristic curve obtained experimentally as shown in FIG. 12.

It will thus be seen from the foregoing that the present invention has a great advantage that since a command is selected and inputted so as to change the automatic control pattern for automatically controlling the temperature controlling units of a vehicle air conditioner system in accordance with supply air temperature data and since the temperature controlling units are automatically controlled in response to the supply air temperature data in accordance with the automatic control pattern changed by the input command, the vehicle occupants are permitted to select a command for changing the automatic control pattern as desired so as to automatically perform a suitable air conditioning control that suits the occupants.

Another great advantage of this invention is that a control apparatus is provided which is capable of suitably performing the air conditioner control method of this invention through electronic controls.

We claim:

1. A method of automatically controlling an air conditioner system for a vehicle passenger compartment, said system comprising means for changing the direction of air discharged into said compartment, air blower means provided in said duct for driving the air at a variable speed, a discharged-air temperature sensor for sensing the temperature of discharged air, in-car sensor for sensing a temperature within said compartment, temperature setting means for setting a desired temperature for said compartment, and means for automatically maintaining the compartment temperature at said desired temperature in response to signals from at least said in-car sensor and said temperature setting means, said method comprising the steps of:
   previously preparing a plurality of automatic control patterns, each of said patterns being independent of any said set desired temperature and including control data for controlling said air direction changing means and said blower means;
   inputting a command signal to select one of said plurality of automatic control patterns; and
   automatically controlling said air direction changing means and said blower means in response to a signal from said discharged air temperature sensor in accordance with a selected one of said automatic control patterns.

2. An air conditioner system for a vehicle passenger compartment comprising:
   means for controlling the air flow discharged into said compartment;
   a discharged-air temperature sensor for sensing the temperature of discharged air flow;
   an in-car sensor for sensing a temperature within said compartment;
   temperature setting means for setting a desired temperature for said compartment;
   means, responsive to signals supplied from at least said in-car sensor and said temperature setting means, for automatically maintaining the temperature in said compartment at said set desired temperature;
   means for storing a plurality of predetermined automatic control patterns, each of said patterns being independent of any said set desired temperature and including control data for controlling said air flow controlling means;
   selector means for generating a command signal indicative of one of said predetermined automatic control patterns, said selector means being independent of any said set desired temperature;
   computing means, responsive to said command signal and a signal from said discharged-air temperature sensor for generating an output control signal in accordance with a selected one of said automatic control patterns; and drive means, responsive to said output control signal from said computing means, for operating said controlling means.

3. An apparatus according to claim 2, wherein said controlling means includes an air mixing damper and a position sensor for sensing the position of said air mixing damper and generating a position signal.

4. An apparatus according to claim 2, wherein:
said controlling means includes an air outlet changeover damper; and
said selector means includes means for selecting a predetermined temperature condition, said air outlet changeover damper being operated by said drive means in accordance with said predetermined temperature condition.

5. An apparatus according to claim 2, wherein:
said controlling means includes means for adjusting the amount of air flow and an air outlet changeover damper; and
said selector means includes means for selecting one of a plurality of combinations of supply air flow values and air outlet changeover damper operating temperature conditions.

6. An apparatus according to claim 2, wherein said selector means includes a card reader.

7. An apparatus according to claim 2, wherein:
said apparatus further comprises ambient sensor means;
said controlling means includes at least one of an outside-inside air changeover damper, an air mixing damper, an air outlet changeover damper, and a fan; and
said drive means includes actuator means for controlling the position of said at least one of an outside-inside air changeover damper, an air mixing damper and an air outlet changeover damper and circuit means for controlling the speed of said fan.

8. An apparatus according to claim 2 or 5 wherein said selector means includes digital numerical input means.

9. An apparatus according to claim 3, wherein said computing means includes means for determining a discharged air temperature in accordance with a predetermined functional relation of said position signal.

10. An apparatus according to claim 2, 3 4 5 or 6, wherein said computing means including a microcomputer.

11. An apparatus according to claim 10, further comprising at least one interrupt control means responsive to said command signal from said selector means to change said automatic control pattern.

* * * * *